(12) United States Patent
Huang et al.

(10) Patent No.: US 9,816,870 B2
(45) Date of Patent: Nov. 14, 2017

(54) TEMPERATURE INDICATING METHOD, TEMPERATURE INDICATING LABEL AND METHOD FOR MANUFACTURING THE LABEL

(75) Inventors: Weimin Huang, Jiangsu (CN); Xuelian Wu, Jiangsu (CN); Yongbo Dai, Sichuan (CN); Min Wei, Jiangsu (CN)

(73) Assignees: Weimin Huang, Nanjing, Jiangsu (CN); Xuelian Wu, Zhenjiang, Jiangsu (CN); Yongbo Dai, Mianyang, Sichuan (CN); Min Wei, Nanjing, Jiangsu (CN); Nanjing Tianlang Pharmaceutical Co., Ltd., Nanjing, Jiangsu (CN)

( * ) Notice: Subject to any disclaimer, the term of this patent is extended or adjusted under 35 U.S.C. 154(b) by 338 days.

(21) Appl. No.: 14/405,703

(22) PCT Filed: Sep. 14, 2012

(86) PCT No.: PCT/CN2012/081394
§ 371 (c)(1),
(2), (4) Date: Apr. 6, 2015

(87) PCT Pub. No.: WO2013/189131
PCT Pub. Date: Dec. 27, 2013

(65) Prior Publication Data
US 2015/0292953 A1    Oct. 15, 2015

(30) Foreign Application Priority Data
Jun. 21, 2012 (CN) .......................... 2012 1 0206952

(51) Int. Cl.
*G01K 5/48* (2006.01)
*G09F 3/00* (2006.01)
(Continued)

(52) U.S. Cl.
CPC .............. *G01K 5/483* (2013.01); *B29C 61/06* (2013.01); *G09F 3/0291* (2013.01); *B29L 2031/744* (2013.01)

(58) Field of Classification Search
CPC ............ G01K 5/00; G01K 5/48; G01K 5/483; G01K 11/00
(Continued)

(56) References Cited

U.S. PATENT DOCUMENTS 5,282,684 A * 2/1994 Holzer .................. G01K 11/06
116/216
5,735,607 A * 4/1998 Shahinpoor et al. .. G01K 5/483
116/216
(Continued)

FOREIGN PATENT DOCUMENTS

CN     2245765      1/1997
CN     1809851      7/2006
(Continued)

OTHER PUBLICATIONS

International Search Report filed in PCT/CN2012/081394 dated Mar. 21, 2013.

*Primary Examiner* — R. A. Smith
(74) *Attorney, Agent, or Firm* — Rankin, Hill & Clark LLP

(57) ABSTRACT

A temperature indicating method, a temperature indicating label used by this method, and a method for manufacturing the temperature indicating label, includes: a, determining the target temperature, adopting the thermal induced shape memory polymer material to manufacture the temperature indicating label; b, heating the temperature indicating label to make it achieve or exceed the initial temperature of glass transition or melting transition but be lower than the terminal temperature of glass transition or melting transition, then finishing the predeformation treatment; and c, placing the
(Continued)

(a)

(b)

predeformed temperature indicating label into the environment which needs temperature indication for a while, observing whether spontaneous shape recovery happens to the label and judging whether the environment temperature has once reached or exceeded the target temperature.

8 Claims, 1 Drawing Sheet

(51) Int. Cl.
 *B29C 61/06* (2006.01)
 *B29L 31/00* (2006.01)
(58) Field of Classification Search
 USPC .......................... 116/219, 221; 374/106, 187
 See application file for complete search history.

(56) References Cited

U.S. PATENT DOCUMENTS

| | | | |
|---|---|---|---|
| 6,720,402 B2 * | 4/2004 | Langer et al. | ........ B29C 61/003 525/415 |
| 7,220,051 B2 * | 5/2007 | Shahinpoor | ............ G01K 5/483 374/195 |
| 7,476,224 B2 * | 1/2009 | Petrakis | .................... G01K 1/02 222/54 |
| 7,628,116 B2 | 12/2009 | Browne et al. | |
| 9,097,594 B2 * | 8/2015 | Rastegar et al. | ....... G01K 11/06 |
| 2010/0218716 A1 | 9/2010 | Havens et al. | |
| 2015/0360499 A1 * | 12/2015 | Huang et al. | .......... B42D 25/30 283/81 |

FOREIGN PATENT DOCUMENTS

| | | | | |
|---|---|---|---|---|
| CN | 200941054 | | 8/2007 | |
| CN | 101040175 | | 9/2007 | |
| CN | 102336996 | | 2/2012 | |
| EP | 2273245 A2 * | | 1/2011 | ............. G01K 5/483 |
| JP | 55144515 A * | | 11/1980 | ............. G01K 11/00 |
| JP | 03183920 A * | | 8/1991 | ............. G01K 11/00 |
| JP | 04238232 A * | | 8/1992 | ............. G01K 11/06 |
| KR | 20030006152 A * | | 1/2003 | ............... G01K 5/48 |

* cited by examiner

TEMPERATURE INDICATING METHOD, TEMPERATURE INDICATING LABEL AND METHOD FOR MANUFACTURING THE LABEL

FIELD OF THE INVENTION

This invention belongs to the technical field of temperature record and indication, and relates to a temperature indicating method to take advantage of the polymer based thermal induced shape memory effect to indicate whether the temperature experienced is above the limit and the exceeding degrees, a temperature indicating label used by the method and the method for manufacturing the temperature indicating label.

BACKGROUND OF THE INVENTION

In many producing, processing, transportation and storage processes, there are strict restrictions on the temperature, particularly the maximum temperature. For example, upper limit of temperature is required in the storage and transportation for many drugs in biomedical field, frozen food in food industry, constant-temperature water bath or oil bath in chemical engineering and storage environment for chemical materials and so on. For now, however, the real-time monitoring of the temperature of each product is not feasible economically and also not necessarily practical. Human vaccine, for instance, is a kind of special pharmaceutical products and requires strict "cold chain" in terms of transportation and storage, i.e., every step in the production, storage and issuing process for each vaccine must be imposed constantly into the required low temperature conditions in order to ensure its quality. At present, the incomplete cold chain (for example, the vaccine in the refrigerator is beyond the temperature limit in a certain period of time due to short-time power off) is an important reason for the deterioration of human vaccine. It's difficult to distinguish the deterioration of human vaccine caused by incomplete cold chain. The deteriorated vaccine not only fails to play an epidemic prevention role to the user, but also sometimes becomes a kind of harm, even a lethal threat. Although real-time monitoring of each vaccine's temperature change is significantly meaningful, the feasibility is unpleasant from the perspectives of economy and technology. The same problem also exists in the frozen food industry and other ones that require constant temperature or limited temperature range. To use a simple, reliable, economical and practical method to detect whether the individual product is beyond the temperature range and the exact exceeding degrees is of huge practical value.

The temperature indicating products which are currently used or reported are mostly electronic devices (CN101040175, CN1809851, CN200941054), mechanical device (CN2245765) and chemical solutions (CN 102336996 A). These technologies are available, but they have limited application with complex producing process and relatively high cost. Moreover, it's difficult to apply them to indicate the temperature of individual products.

A lot of polymer materials have the shape memory effect and are able to sense the changes in the environment and response in the form of morphology change (restore the initial state). Currently, the thermal induction is the most common induction for shape memory polymers and its principle is to employ the temperature sensitivity of the polymers to induce the spontaneous shape recovery. Thermal induced shape memory polymers stand out as the ideal choice to manufacture a large number of cheap temperature indicating products because of the shape memory effect and low cost.

Thermal induced shape memory polymers have the following characteristics:

(1) the predeformation: heating up the shaped shape memory polymer to a certain temperature, making the polymer transfer from glass state to rubber state or from solid phase to melting phase; and exerting deformation force to deform it and cooling down in the deformation state, making the polymer transfer from rubber state to glass state or from melting phase to solid phase as well as completely or partially maintain the deformation.

(2) the spontaneous shape recovery: when the deformed polymer is heated to the temperature above the initial temperature of glass transition or melting transition, the material can restore completely or partially to the original shape.

SUMMARY OF THE INVENTION

A technical problem to be solved by this invention is to provide a temperature indicating method which is able to instruct the level of temperature experienced by the measured object and the environment and also is easy to use and achieves low cost while taking advantage of the thermal induced shape memory property of polymers.

Another technical problem to be solved by the invention is to provide a temperature indicating label which is able to instruct the level of temperature experienced by the measured object and the environment and possesses simple structure, small size and low cost, and a method for manufacturing the labels.

The temperature indicating method for the thermal induced shape memory polymer adopted by the invention is as follows:

a. determining the target temperature that needs to be indicated, adopting the thermal induced shape memory polymer material to manufacture the temperature indicating label, wherein the described target temperature should be not lower than the initial temperature of glass transition or melting transition of the adopted thermal induced shape memory polymer material;

b. heating temperature indicating label to make it achieve or exceed the initial temperature of glass transition or melting transition but be lower than the terminal temperature of glass transition or melting transition, then employing an external force on the temperature indicating label to cause deformation, cooling it down to the temperature below the initial temperature of glass transition or melting transition under the deformation condition, and then finishing the predeformation treatment; and c. placing the predeformed temperature indicating label into the environment which needs temperature indication for a while, observing whether spontaneous shape recovery happens to the label. If so, it should be concluded that the environmental temperature has once reached or exceeded the target temperature.

The residual deformation quantity of the thermal induced shape memory polymer material after predeformation treatment is higher than 5% while the shape recovery ratio after the spontaneous shape recovery is higher than 20%.

The described thermal induced shape memory polymer material may be one of a pure polymer, polymer foam or polymer matrix composite. The referred polymer foam could be open-cell and closed-cell while the referred polymer matrix composite fill could be powder or fiber.

For Step b, multiple predeformations are formed on different parts of the temperature indicating label, and the predeformations are separately formed in a series of temperature that is not lower than the initial temperature of glass transition or melting transition.

The substrate is thermal induced shape memory polymer material and presents the predeformation formed in the temperature range from the initial temperature to the terminal temperature of glass transition or melting transition.

The shape of the temperature indicating label is cylindrical, spherical, flat, filmy, linear or strip or their combination.

The described predeformation refers to stretching, bending, torsion, compression, indentation, embossing or flattening or the combination performed on the temperature indicating label.

The described multiple predeformations are formed on different parts of the temperature indicating label, and the predeformations are separately formed in a series of temperature that is not lower than the initial temperature of glass transition or melting transition.

The described kinds of predeformation are a series of indentations arranged on the described substrate and each indentation possesses a mark corresponding to the target temperature indicated (such as numerical tags, etc.).

The method for manufacturing the temperature indicating label comprises the following steps:

selecting thermal induced shape memory polymer material to manufacture the substrate of temperature indicating labels based on the target temperature, heating the substrate to a certain temperature in the range from the initial temperature to the terminal temperature of glass transition or melting transition, and then decreasing the temperature; in the process when the temperature is lower than the initial temperature of glass transition or melting transition, deformation is generated in different regions of substrate by the external force at a series of various temperature points, and the external force can be retained until the temperature is lower than the initial temperature of glass transition or melting transition; the material hardens again and forms a temperature indicating label with different kinds of predeformation and each of them possesses the corresponding spontaneous shape recovery temperature.

Compared with the prior art, the present invention has the following advantages:

1. The temperature indicating method provided by the invention realizes the temperature sensitivity through the thermal induced shape memory effect of polymer material without complex circuit or mechanical device structure. It's easy to implement and the material itself can be used to indicate the temperature. The price is low.

2. The temperature indicating method provided by the invention can be achieved by producing labels with different shapes and sizes through selecting different polymers depending on the need.

3. The temperature indicating label provided by the invention can not only instruct the temperature of the whole environment in which the batch products are placed, but also realize the microminiaturization in size. Through the polymer temperature indicating label that is attached directly or indirectly, the temperature of the tiny environment in which the individual product is placed is indicated.

4. The thermal induced shape memory polymer used in the invention can be selected from the existing ones and it's unnecessary to develop new specified material, so the cost is low.

DETAILED DESCRIPTION OF THE EMBODIMENTS

Embodiment 1

Figure 1:
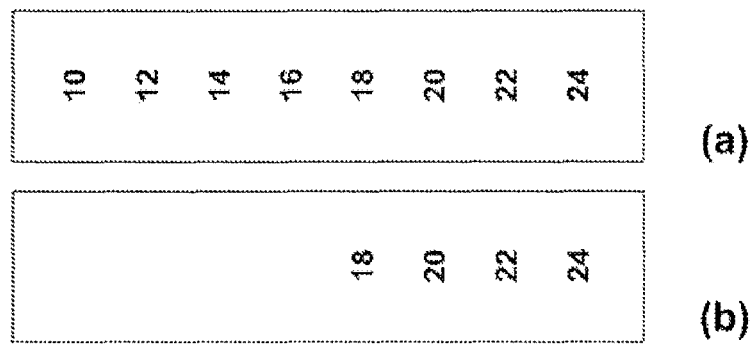
FIG. 1 is a schematic diagram of one type of temperature indicating label in Embodiment 3 of this invention.

A temperature indicating method by using the thermal induced shape memory effect of polymers, which has the function to display whether the highest temperature experienced has once been above the limit and the exceeding degrees. Thermal induced shape memory effect of the referred thermal induced shape memory polymer is significant: after the thermodynamics process, the residual deformation of polymer is higher than 5% while the shape recovery rate is higher than 20%. The referred polymer can also be a corresponding matrix polymer foam or polymer matrix composite.

The referred polymer foam could be open-cell and closed-cell while the polymer matrix composite fill could be powder or fiber.

Make the thermal induced shape memory polymer into a temperature indicating label, first undergo the predeformation treatment in the starting temperature which is not less than the temperature of glass transition or melting transition, and then place it into the working environment. When the highest temperature is above the set limit, the temperature indicating label will undergo the spontaneous shape recovery. According to the final morphology, it realizes the function of displaying whether the highest temperature experienced has once been above the limit and the exceeding degrees.

The shape of the temperature indicating label can be cylindrical, spherical, flat, filmy, linear or strip or their combination. According to the requirement of working conditions, the key size ranges from a few microns to a few decimeters.

Predeformation treatment can be stretching, bending, torsion, compression, indentation, embossing, flattening and so on. Predeformation can be visible or invisible to the naked eyes.

The applicable fields of this method are as follows: drugs or food with limited storage temperature, water bath or oil bath with limited usage temperature, hatch/breeding of aquatic products or crop seeds breeding with limited environmental temperature, etc., and related and similar applied fields which are based on the same principle but not mentioned above.

The maximum and minimum differences between the highest temperature indicated in this method and the actual maximum temperature are ±3.0° C. and ±0.5° C., respectively.

Embodiment 2

Make a strip polymer temperature indicating label with dimensions of 20 mm×2 mm×1 mm. The selected material is styrene polymers with shape memory effect, whose glass transition temperature is above −10° C. The polymer sample with size mentioned is heated to the temperature of no less than 20° C. above its glass transition temperature, and then treated with predeformation of bending (folded it into a U shape). Maintain the external force, cool it down to −15° C. At that time, the label keeps U shape spontaneously and then the label is put in the cold storage environment with temperature requirement as −20 to −10° C. When the storage temperature increases to −10° C. or above, the shape of material will recover spontaneously, appearing as its initial shape of strip.

Thus, this polymer could be used to indicate whether the temperature of cold storage environment goes beyond the upper limit of required temperature.

Embodiment 3

Figure 2:
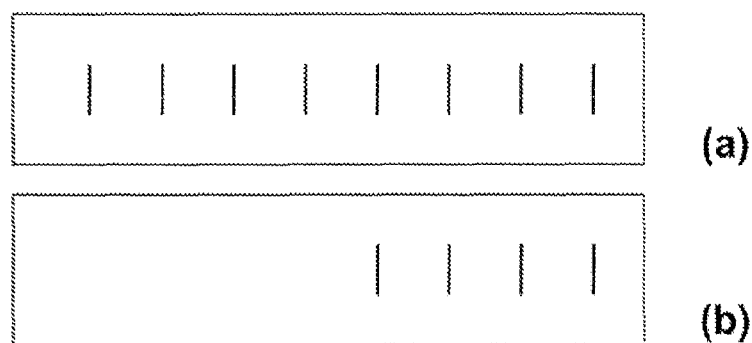
FIG. 2 is a schematic diagram of another type of temperature indicating label in Embodiment 3 of this invention.

Make a polymer temperature indicating label with dimensions of 75 mm×20 mm×5 mm. The selected material is polyurethane polymer possessing the shape memory effect, of which the glass transition temperature is above 10° C. Heat the polymer sample with specified size to the temperature of no less than 10° C. above its glass transition temperature. In the slow cooling processing, use an indentation machine to produce a series of indentations on its surface in 24° C., 22° C., 20° C., 18° C., 16° C., 14° C., 12° C. and 10° C., respectively. The indentation can be numbers (the area of each number is about 5 mm×5 mm) shown in FIG. 1 or can also be calibration (10 mm in length) shown in FIG. 2, with indentations arrayed linearly. Indentation spacing is 5 mm and indentation depth is 2 mm. After being cooled and finalized, the indentation is tagged and sealed into the package for cold storage products. Different final forms of the polymer indentation correspond to different highest heating temperatures. Before using the product, the highest temperature, which the product goes through in the process of storage, can be read according to the various final forms of the indentations.

Embodiment 4

Figure 3:
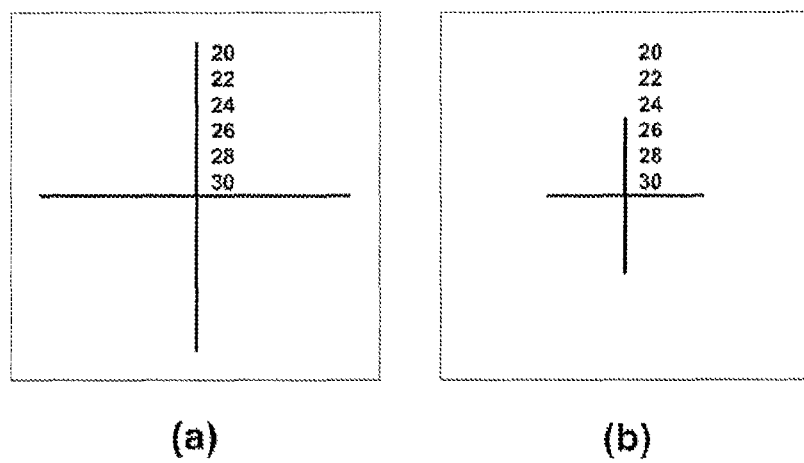
FIG. 3 is a schematic diagram of the temperature indicating label in Embodiment 4 of this invention.

Make a polymer temperature indicating label with dimensions of 10 mm×10 mm×0.5 mm. The selected material is epoxy polymer with the shape memory effect, of which the glass transition temperature is above 20° C. Heat the polymer sample with specified size to the temperature of 10° C. above its glass transition temperature. In the slow cooling processing, the nano-indentation apparatus is employed to produce a series of linear indentations (as shown in FIG. 3), of which the depth is 20 μm (a magnifying glass is needed to observe) and the length is 30 μm, on the sample surface in the temperature of 30° C., 28° C., 26° C., 24° C., 22° C., 20° C. respectively. Indentation lines made in different temperatures are connected end to end and form a cross shape on the whole. After being cooled and finalized, indentation is tagged and sealed into the package for cold storage products. Different final forms of the polymer indentations correspond to the different highest heating temperatures. Before using the product, the highest temperature, which the product goes through in the process of storage, can be read according to the various final forms of the cross on the temperature indicating label.

The invention claimed is:

1. A temperature indicating method, comprising:
   a. determining a target temperature to be indicated, and adopting a single piece of thermal induced shape memory polymer material to manufacture a temperature indicating label, wherein the target temperature is no lower than an initial temperature of glass transition or melting transition of the adopted thermal induced shape memory polymer material;
   b. heating the temperature indicating label to achieve or exceed the initial temperature of glass transition or melting transition but lower than a terminal temperature of glass transition or melting transition, then employing an external force on the temperature indicating label to cause deformation in the polymer material, cooling the temperature indicating label down to the temperature below the initial temperature of glass transition or melting transition under the deformation condition thereby forming multiple predeformations on different parts of the temperature indicating label, wherein the predeformations are separately formed in a series of temperatures that are not lower than the initial temperature of glass transition or melting transition to provide a predeformed temperature indicating label; and
   c. placing the predeformed temperature indicating label into an environment which needs temperature indication, and observing whether spontaneous shape recovery happens to the predeformed temperature indicating label, wherein the spontaneous shape recovery allows visual determination of whether the label has been exposed to a temperature above the target temperature, and if the temperature is above target temperature, how far the temperature is above the target temperature.

2. The temperature indicating method according to claim 1, wherein a residual deformation quantity of the thermal induced shape memory polymer material after predeformation treatment is higher than 5% while a shape recovery ratio after the spontaneous shape recovery is higher than 20%.

3. The temperature indicating method according to claim 1, wherein the thermal induced shape memory polymer material may be one of a pure polymer, polymer foam or polymer matrix composite.

4. A temperature indicating label comprising a substrate, the substrate being a single piece of thermal induced shape memory polymer material presenting multiple predeformations, wherein:
   the multiple predeformations are formed in a temperature range from an initial temperature to a terminal temperature of glass transition or crystallization transition of the polymer material,
   the multiple predeformations are formed on different parts of the temperature indicating label,
   the multiple predeformations are separately formed by applying an external force to the polymer material, in a series of temperatures that are not lower than the initial temperature of glass transition or melting transition, and the external force is retained during cooling until the temperature of the polymer material is lower than the initial temperature of glass transition or a crystallization finish temperature, and
   the multiple predeformations are configured such that when the label is heated to a temperature above the initial temperature of glass transition or melting transition, the label experiences spontaneous shape recovery such that the multiple predeformations provide an indication of how far the temperature went above the initial temperature of glass transition or melting transition.

5. The temperature indicating label according to claim 4, wherein the shape of the temperature indicating label is cylindrical, spherical, flat, filmy, linear, strip, or combination thereof.

6. The temperature indicating label according to claim 4, wherein the multiple predeformations each include stretching, bending, torsion, compression, indentation, embossing, flattening, or the combination thereof performed on the temperature indicating label.

7. The temperature indicating label according to claim 4, wherein the multiple predeformations are a series of indentations arranged on the substrate and each indentation possesses a mark corresponding to a target temperature indicated.

8. A method for manufacturing a temperature indicating label, comprising:
- selecting a single piece of thermal induced shape memory polymer material to manufacture a substrate of a temperature indicating label based on a target temperature,
- heating the substrate to a certain temperature in a range from an initial temperature to a terminal temperature of glass transition or melting transition of the polymer material, and
- then decreasing the temperature of the substrate to below the initial temperature of glass transition or a crystallization transition of the polymer material;
- wherein when the temperature of the substrate is higher than the initial temperature of glass transition or melting transition, deformation is generated in different regions of the substrate by applying an external force to the substrate at a series of various temperature points, and the external force is retained until the temperature of the substrate is lower than the initial temperature of glass transition or a crystallization finish temperature of the polymer material;
- wherein, when the temperature of the substrate is lower than the initial temperature of glass transition or crystallization finish temperature, the material hardens to thereby form a temperature indicating label with a series of predeformations, each predeformation possessing spontaneous shape recovery that is activated upon heating the substrate to a temperature that corresponds to the temperature at which the predeformation was formed.

* * * * *